US011190849B2

(12) United States Patent
Kawakami (10) Patent No.: US 11,190,849 B2
(45) Date of Patent: Nov. 30, 2021

(54) SERVER AND PROGRAM

(71) Applicant: DWANGO Co., Ltd., Tokyo (JP)

(72) Inventor: Nobuo Kawakami, Tokyo (JP)

(73) Assignee: DWANGO CO., LTD.

( * ) Notice: Subject to any disclaimer, the term of this patent is extended or adjusted under 35 U.S.C. 154(b) by 0 days.

(21) Appl. No.: 17/257,540

(22) PCT Filed: Jun. 26, 2019

(86) PCT No.: PCT/JP2019/025377
§ 371 (c)(1),
(2) Date: Dec. 31, 2020

(87) PCT Pub. No.: WO2020/021947
PCT Pub. Date: Jan. 30, 2020

(65) Prior Publication Data
US 2021/0250653 A1 Aug. 12, 2021

(30) Foreign Application Priority Data
Jul. 26, 2018 (JP) .............................. JP2018-140656

(51) Int. Cl.
*H04N 7/173* (2011.01)
*H04N 21/4784* (2011.01)
(Continued)

(52) U.S. Cl.
CPC ... *H04N 21/4784* (2013.01); *H04N 21/21815* (2013.01); *H04N 21/222* (2013.01); *H04N 21/235* (2013.01)

(58) Field of Classification Search
CPC ............. H04N 21/4784; H04N 21/222; H04N 21/21815; H04N 21/235
(Continued)

(56) References Cited

U.S. PATENT DOCUMENTS 6,029,195 A * 2/2000 Herz ...................... G06Q 30/02
                                                    725/116
10,580,397 B2 * 3/2020 Castillo ..................... G01S 5/18
(Continued)

FOREIGN PATENT DOCUMENTS

JP       2009200769 A    9/2009
JP       2014052920 A    3/2014

OTHER PUBLICATIONS

PCT/JP2019/025377 International Search Report and Written Opinion dated Jul. 23, 2019, 1 pg.
(Continued)

*Primary Examiner* — Jefferey F Harold
*Assistant Examiner* — Sahar Aqil Riaz
(74) *Attorney, Agent, or Firm* — Bracewell LLP; Douglas F. Stewart; Patrick J. Connolly (57) ABSTRACT

In an aspect of the present invention, a server comprises a calculating unit, a determination unit, and a contribution implementing unit. The calculating unit calculates an index corresponding to the predicted value of an item contributed to the content. The determination unit determines the consideration provided to a viewer of the content based on the index in order to implement contribution of the item to the content. When an implementation request for the contributed item is received, the contribution implementing unit superimposes on the content an image of the item that is the subject of the implementation request in exchange for a consideration. The determination unit determines the consideration as a first value when the index is equivalent to a first predicted value and determines the consideration as a second value greater than the first value when the index is equivalent to a second predicted value, which corresponds to contribution of items that are more active in the content than those of the first predicted value.

10 Claims, 7 Drawing Sheets

(51) Int. Cl.
*H04N 21/218* (2011.01)
*H04N 21/222* (2011.01)
*H04N 21/235* (2011.01)

(58) Field of Classification Search
USPC .......................................................... 725/23
See application file for complete search history.

(56) References Cited

U.S. PATENT DOCUMENTS

| | | | | |
|---|---|---|---|---|
| 2005/0288954 | A1* | 12/2005 | McCarthy | A61B 5/6838 |
| | | | | 705/2 |
| 2012/0288097 | A1* | 11/2012 | Hatayama | G06Q 30/0601 |
| | | | | 380/287 |
| 2013/0205324 | A1* | 8/2013 | Sinha | H04N 21/432 |
| | | | | 725/23 |
| 2014/0370958 | A1* | 12/2014 | Lutnick | G07F 17/32 |
| | | | | 463/17 |
| 2015/0363817 | A1* | 12/2015 | Viharo | H04N 21/4784 |
| | | | | 725/14 |
| 2017/0201779 | A1* | 7/2017 | Publicover | H04N 21/4532 |
| 2018/0260796 | A1* | 9/2018 | McDonald | H04L 65/60 |
| 2019/0362701 | A1* | 11/2019 | Castillo | G10L 25/84 |

OTHER PUBLICATIONS

MoguLive, "The secret of the loveliness of the virtual beauty in the bud 'Shinonome *' of attention-?" Mogura, Inc., published Mar. 16, 2018, accessible at https://www.moguravr.com/shinonome-megu, 20 pgs.

* cited by examiner

SERVER AND PROGRAM

TECHNICAL FIELD

The present invention relates to content distribution.

BACKGROUND ART

During live broadcasts (distribution) of content such as a video, an interactive viewing experience can be created by having viewers post comments and the distributor respond to posted comments. Recently, a live broadcasting service that includes a tip jar function has also been proposed.

For example, Patent Document 1 has proposed a function equivalent to providing gratuities or pledges to content performers in information providing systems that provide content-sharing services such as videos.

PRIOR ART DOCUMENTS

Patent Documents

Patent Document 1: JP 2012-120098 A

SUMMARY OF THE INVENTION

Implementation of a tip jar function can provide an incentive to distributors to create more content. By superimposing on the content an icon corresponding to the consideration paid by a viewer along with the name (nickname) of the viewer and comments, the tip jar function can contribute to the formation of an interactive community in which the distributor can thank viewers for their contributions and other viewers can respond to large contributions. A viewer making a contribution can also make an appeal to the distributor and other viewers based on the amount of money contributed. In other words, the tip jar function also encourages viewers to reveal themselves.

However, for example, in popular content, if a large number of viewers simultaneously make a tip jar request and the number of icons displayed in a short period of time exceeds the ability of the distributor and other viewers to keep up, it becomes difficult for both the distributor and viewers to know who made contributions and how much, undermining the interactive communication mentioned above. Also, viewers who made contributions may become dissatisfied with the fact that they have made a contribution but have not received the attention they expected. This may lead them to distrust the tip jar function and become less likely to use it. By concentrating on tip jar contributions, the content may become impeded by icons and thus difficult to view, and the processing burden may become heavy due to the display of icons.

If a high hurdle is set for viewers to contribute money, such as a high minimum amount, there is a chance that contributions to the tip jar will drop off. Also, if the hurdle is set too high, viewers may not be willing to contribute money and use of the tip jar function may be lower than expected. However, if the hurdle is set too low, there is a chance that concentrated use of the tip jar will not ease off very much. These problems apply to similar function extensions, whether or not they have a mechanism for sending money to distributors like a tip jar, such as those in which viewers decorate content in exchange for a consideration.

It is an object of the present invention to optimize the number of times a tip jar is used for content.

In an aspect of the present invention, a server comprises a calculating unit, a determination unit, and a contribution implementing unit. The calculating unit calculates an index corresponding to the predicted value of an item contributed to the content. The determination unit determines the consideration provided to a viewer of the content based on the index in order to implement contribution of the item to the content. When an implementation request for the contributed item is received, the contribution implementing unit superimposes on the content an image of the item that is the subject of the implementation request in exchange for a consideration. The determination unit determines the consideration as a first value when the index is equivalent to a first predicted value and determines the consideration as a second value greater than the first value when the index is equivalent to a second predicted value, which corresponds to contribution of items that are more active in the content than those of the first predicted value.

In this way, the present invention can optimize the number of times a tip jar is used for content.

EMBODIMENTS OF THE INVENTION

The following is a description of embodiments with reference to the drawings. Elements identical or similar to items that have already been described will be denoted by identical or similar reference numbers and further explanation of these elements will be omitted.

In the description of the embodiments, the content is a live video broadcast. However, the content can be a live broadcast of something other than video (such as still images and text) or may be stored content ("archived content") as explained in the modified example below. In the description of the embodiments, the function including the so-called tip jar function is referred to using the expression "item contribution." In this function, viewers make contributions by selecting an item and the selected item is superimposed on the live video broadcast (content). Some of the consideration given to a viewer for selecting an icon may or may not be returned to the distributor of the live video broadcast, as in the case of a conventional tip jar function. (It may simply be an animated effect on the video.) Here, the consideration may be expressed using actual goods or virtual goods (including points) redeemable in the video broadcasting system.

Here, live video broadcast refers to all video uploaded from a video source (such as a distributor terminal) to a live broadcasting server and distributed in real time. There are no particular restrictions on the type of video. Specific examples of live video broadcasts include video simply taken by the distributor (such as selfies, fixed point camera video, and drive recorder video), video of a performance by the distributor (such as the distributor singing, dancing, playing a game, or talking), video in which the distributor provides play-by-play or commentary on, for example, a game, and virtual reality (VR) video taken with a virtual camera of images in virtual space where an avatar serving as the alter ego of the distributor is present.

Embodiments

Figure 2:
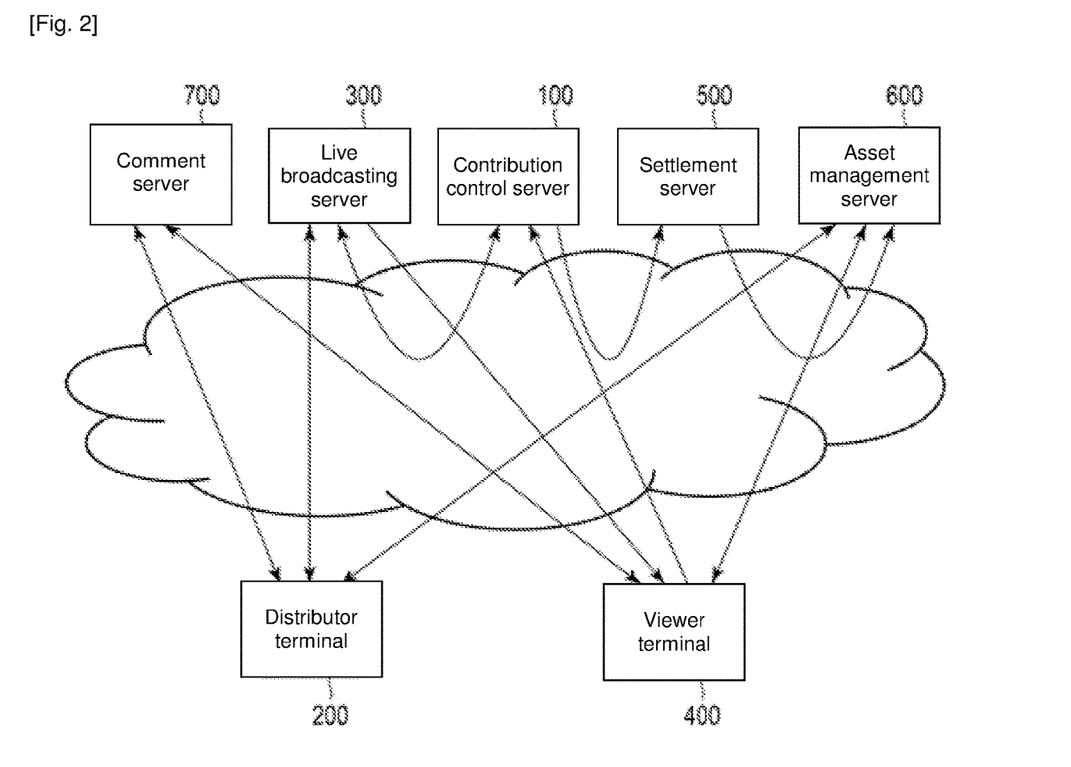
FIG. 2 is a block diagram of a video broadcasting system including the contribution control server in FIG. 1.

The contribution control server in the present embodiment can be incorporated in a live video broadcasting system such as the one shown in FIG. 2. This system includes the contribution control server 100 in the present embodiment, a distributor terminal 200, a live broadcasting server 300, a viewer terminal 400, a settlement server 500, an asset management server 600, and a comment server 700. Various servers are connected to various terminals via a network such as the internet to exchange data. The servers are also connected to other servers via a network to exchange data.

The distributor terminal 200 can, for example, sequentially encode video/audio data generated by a camera/microphone connected to the distributor terminal 200, and send (upload) the encoded (multimedia) data to the live broadcasting server 300.

The distributor terminal 200 can be an electronic device such as a personal computer (PC), a mobile device (such as a tablet, smartphone, laptop, feature phone, or portable game console), a virtual reality (VR) terminal, an augmented reality (AR) terminal, a game console, or a TV receiving unit (such as an internet TV).

The live broadcasting server 300 receives encoded data from the distributor terminal 200. In response, it performs the required processing such as superimposing images of contributed items requested by the contribution control server 100, re-encoding, and conversion to HTTP (Hypertext Transfer Protocol) live streaming (HLS). The name (nickname) of a viewer requesting an item contribution (contribution requesting party) and/or comments from the contribution requesting party can be superimposed along with the image of the item. The live broadcasting server 300 distributes encoded (processed) data to the distributor terminal 200 and viewer terminals 400.

The live broadcasting terminal 300 also sends data to the contribution control server 100 such as the number of simultaneous viewers of the live video, attributes of the live video distributor (such as number of followers, the number of paying channel members, and the level of the distributor), and the attributes of live video viewers (such as whether a viewer is following the distributor of the live video, whether the viewer is a paying channel member, and whether the viewer is a member of a premium service plan of the live video broadcasting system). Here, the level may be a value determined based on the activity record of the distributor at the live video broadcasting system. For example, this may be a value determined based on the number of followers of the distributor who have a certain attribute, such as the number of subscribers to a premium service plan.

A viewer terminal 400 receives the encoded data from the live broadcasting server 300, decodes the encoded data, and reproduces the live broadcasting video (including audio). The viewer terminal 400 sequentially receives comment data posted by the user operating the viewer terminal 400 and by other viewers of the live broadcast video from the comment server 700, and superimposes the comments indicated by the comment data on the live broadcast video. Comments may be displayed for a predetermined time and move from left to right in the display region for live broadcast video. The viewer terminal 400 can also generate comment data to be posted on the live broadcast video based on input from the user and transmit the data to the comment server 700.

The viewer terminal 400 can also generate an item contribution request for the live broadcast video based on input from the user, and transmits the contributed item to the contribution control server 100. The viewer terminal 400 can also generate a request to view asset data associated with the identifier for the user of the viewer terminal 400 based on the input from the user. This can also be sent to the asset management server 600.

The viewer terminal 400 can be an electronic device similar to the distributor terminal 200. However, the viewer terminal 400 is not required to have the capacity to capture and encode video/audio data. The distributor terminal 200, like a viewer terminal 400, can play live broadcast videos, post/view comments, and view asset data associated with the identifier of the user of the distributor terminal 200.

The settlement server 500 processes assets held by a user, that is, assets held by the distributor or the viewer, in response to a settlement request from the contribution control server 100. For example, when the settlement server 500 receives a settlement request regarding a contributed item from the contribution control server 100, the settlement server extracts the identifier of the contribution requester and data representing the consideration for the contributed item from the settlement request. The settlement server 500 then accesses the asset management server 600 and updates the asset data associated with the viewer identifier so as to reduce it by the value corresponding to the consideration for the contributed item, such as a certain number of points. The settlement server 500 may also access the asset management server 600 and update the asset data associated with the identifier of the distributor of the video that was the target of the contributed item (included in the settlement request) so as to increase it by the value corresponding to the consideration for the contributed item. In this way, some of the consideration given to the viewer is returned to the distributor (corresponding to a tip jar function).

The settlement server 500 returns a settlement response to the contribution control server 100, which may include a code indicating whether or not the settlement was successful. In addition, the settlement server 500 may perform settlement processing (that is, increasing the asset balance) on the assets of the user who has issued the request in response to a request from the distributor terminal 200 or a viewer terminal 400.

The asset management server 600 is a database server that stores the asset data of a user associated with the identifier for the user, who is the distributor or a viewer. The asset management server 600 updates, that is, increases or decreases, the user owned asset data in response to a request from the settlement server 500. The asset management server 600 prompts the user issuing the request to review their asset balance in response to a request from the distributor terminal 200 or a viewer terminal 400. Specifically, when the asset management server 600 receives a request to view asset data, the asset data of the user issuing the review request is returned to the distributor terminal 200 or to the viewer terminal 400 that is the source of the review request.

The comment server 700 receives comment data for the video being broadcast live from the distributor terminal 200 or viewer terminals 400, and sequentially transmits the data to the distributor terminal 200 or the viewer terminals 400 receiving the video. This allows the distributor and viewers to communicate via text during live video broadcasts.

When the contribution control server 100 receives an item contribution implementation request for a live video broadcast from a viewer terminal 400, the contribution control server accesses the settlement server 500 and performs settlement processing based on the implementation request. When the settlement is successful, the contribution control server 100 transmits an item contribution request to the live broadcasting server 300. The item contribution request may include, for example, an identifier that identifies the item to be contributed and an identifier that identifies the viewer requesting the contribution. The request may also include data indicating the consideration given to the contribution requester and comment data from the viewer who is the contribution requester.

The contribution control server 100 does not fix the consideration for contributed items but allows for variability. Specifically, the contribution control server 100 calculates an index corresponding to the predicted value of the activity of the contributed item to the live broadcast video, and determines the consideration based on the index. The contribution control server 100 then generates notification data indicating the determined consideration and transmits the notification data to the viewer terminal 400.

While this index is described in greater detail, the contribution control server 100 can use the number of simultaneous video viewers, the situation with respect to received item contribution requests, and distributor and viewer attributes to predict to some extent how many items will be added to the video in the near future, and by extension, how many item images will be superimposed on the video. For example, when a large number of viewers are watching a video, the number of potential requesters for an item contribution and the reaction of the large number of viewers to contributed items can be expected. Therefore, there is a good chance that a large number of viewers will want to contribute items. If a large number of item contribution requests are actually made, most of the video will become filled with item images in the near future, and it will be difficult to view individual contributed items. However, if hardly any item contribution requests have been made, there will be hardly any item images superimposed on the view in the near future, and there will be almost no problem in viewing individual contributed items.

The contribution control server 100 determines that a higher consideration will be given for a more active item contribution to a live broadcast video. When item contributions to a live video broadcast are likely to be active, that is, likely to make it difficult to view individual contributed items, the consideration for contributed items increases. This may make viewers hesitate before contributing items and keep the number of contributed items from becoming too numerous. In other words, problems caused by the contribution of too many items can be prevented, such as two-way communication being impaired, viewers contributing items becoming dissatisfied with not receiving as much attention as expected, and the superimposition processing for item images becoming excessive for the live broadcasting server 300. However, when item contributions to a live video broadcast are unlikely to be active, that is, when it is unlikely that it will be difficult to view individual contributed items, the consideration for item contributions decreases, making it easier for viewers to contribute items. This encourages use of the item contribution function.

The number of devices shown in FIG. 2 is for illustrative purposes only. Because the number of viewer terminals 400 at any given time is variable, it may be zero or it may be hundreds or thousands. Because the live broadcasting system in FIG. 2 can broadcast video in parallel, several distributor terminals 200 can be used. A web server not shown in FIG. 2 may also be used.

A contribution control server 100 will now be described in detail with reference to FIG. 1 and FIG. 3 to FIG. 9.

Figure 1:
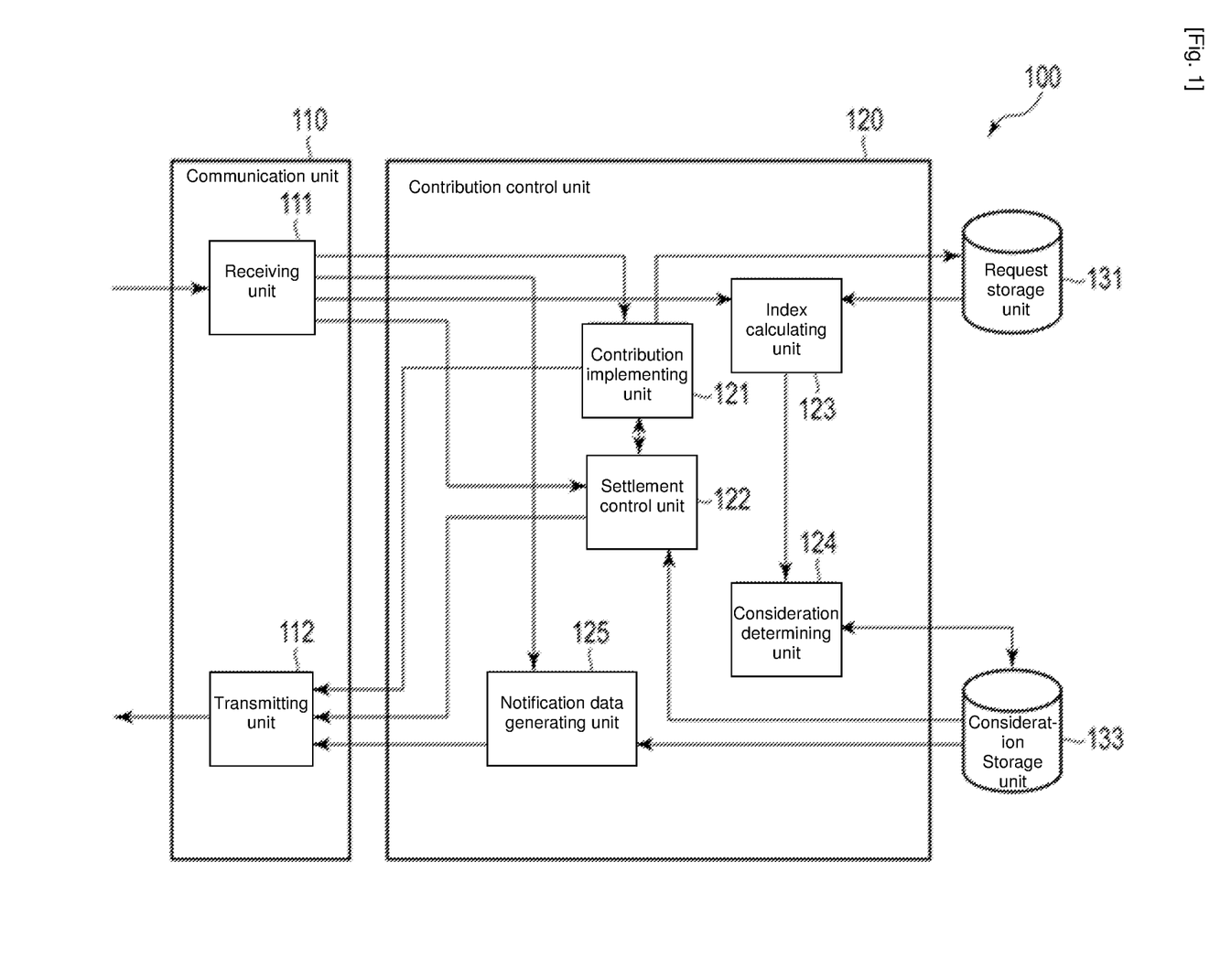
FIG. 1 is a block diagram of a contribution control server in an embodiment of the present invention.

The contribution control server 100 is a computer that can include, for example, a processor that performs input/output control, communication control, and item contribution control (that is, settlement control, item contribution implementation, index calculation, consideration determination, etc.). Here, the processor is typically a CPU (central processing unit) and/or GPU (graphics processing unit), but may also be a microcomputer, an FPGA (field programmable gate array), or DSP (digital signal processor). The contribution control server 100 also includes memory for temporarily storing programs executed by the processor and data used by the processor to perform processing.

The contribution control server 100 may handle all data in an on-memory state or some data may be saved to an auxiliary storage device. The auxiliary storage device may be, for example, an HDD (hard disk drive), SSD (solid state drive), or flash memory built into or externally connected to the contribution control server 100, or may be a database server accessed by the contribution control server.

The contribution control server 100 may be a combination of computers. For example, the functional units in the contribution control server 100 such as the communication unit 110, the contribution control unit 120, and the various storage units described below may be mounted in separate computers.

The contribution control server 100 can also use a communication I/F (interface) to connect to the network. The communication I/F may be built into the contribution control server 100 or externally attached to the contribution control server 100. The communication I/F can be a module for communicating with external devices such as the live broadcasting server 300, viewer terminals 400, and the settlement server 500 via the network.

The description of the configuration of the contribution control server 100 will now be continued with reference to FIG. 1. The contribution control server 100 of FIG. 1 includes a communication unit 110, a contribution control unit 120, and various storage units.

The communication unit 110 may be the communication I/F described above and is used to receive item contribution implementation requests from viewer terminals 400, send settlement requests generated by implementation requests to the settlement server 500, receive settlement request responses from the settlement server 500, and send item contribution requests corresponding to implementation requests that have been settled normally to the live broadcasting server 300 via the network.

Specifically, the communication unit 110 includes a receiving unit 111 and transmitting unit 112.

The receiving unit 111 receives data from the live broadcasting server 300, viewer terminals 400, and the settlement server 500.

(1) The receiving unit 111 receives item contribution implementation requests from viewer terminals 400. Here, item contribution implementation requests can include, for example, an identifier that identifies the item to be contributed, an identifier that identifies the viewer who is the requester, consideration displayed on the screen of the viewer terminal 400 of the contribution requester when the request was issued, data showing the consideration that the requester has agreed to provide and, optionally, comment data from the requester. The data indicating a consideration may directly indicate the consideration or the value of the intermediate parameter described below. It may also indicate when the consideration was decided and notification given or indicate that it is the nth consideration subject to decision and notification. The receiving unit 111 sends an implementation request to the contribution implementing unit 121.

(2) The receiving unit 111 can receive data related to the video being broadcast live by the live broadcasting server 300. Specifically, the receiving unit 111 can receive data indicating the number of simultaneous video viewers, the number of followers of the video distributor among the number of simultaneous video viewers, the number of special followers of the video distributor, the number of simultaneous video viewers, distributor attributes, and viewer attributes. The receiving unit 111 sends data related to the video being broadcast live to the index calculating unit 123.

Here, the special follower and the other ordinary followers may be determined based on whether or not they are members of the pay channel provided by the distributor. Viewers who are members of the pay channels provided by a distributor have a stronger desire to attract attention from the distributor and support the activities of the distributor than those who are not. As a result, they are more likely to actively contribute items. Attributes of viewers may include the amount of service charges paid for the services provided by the live broadcasting system, such as whether or not the viewer is a subscriber to the premium service plan of the live broadcasting system. Viewers who pay a large amount of service charges for the services provided by the live broadcasting system may have a lower psychological hurdle to contributing items than those who do not.

(3) The receiving unit 111 receives a settlement response to a settlement request sent from the settlement server 500, and sends the response to the settlement control unit 122.

(4) The receiving unit 111 may receive acquisition requests for consideration notification data described below from viewer terminals 400 and send the requests to the notification data generating unit 125.

The transmitting unit 112 transmits various types of data to, for example, the live broadcasting server 300, the viewer terminal 400, and the settlement server 500. Specifically, the transmitting unit 112 receives item contribution requests from the contribution implementing unit 121 and transmits the item contribution requests to the live broadcasting server 300. The transmitting unit 112 receives settlement requests from the settlement control unit 122 and transmits the settlement requests to the settlement server 500. The transmitting unit 112 also receives notification data from the notification data generating unit 125 and transmits the notification data to viewer terminals 400. The notification data may be transmitted directly to a viewer terminal 400, or may be transmitted to a viewer terminal 400 via the live broadcasting server 300.

The notification data is described in greater detail below, but the value of the consideration for an individual contributed item may be shown or the value of a unique intermediate parameter used to calculate the individual consideration may be shown. The transmitting unit 112 may receive a response indicating acceptance/rejection of an item contribution implementation request from the contribution implementing unit 121 and send the response to the viewer terminal 400 of the contribution requester.

The contribution control unit 120 may be the processor and memory described above. The contribution control unit 120 receives data such as an item contribution implementation request, data related to the video being broadcast live, a settlement response, and a notification data acquisition request from the communication unit 110. The contribution control unit 120 also retrieves any data necessary from the various storage units. The contribution control unit 120 calculates an index to determine the consideration, generates notification data indicating the consideration, controls the settlement process performed by the settlement server 500, and implements an item contribution based on data received from the communication unit 110 and/or data retrieved from the various storage units. The contribution control unit 120 also sends various types of data, such as notification data, settlement requests, responses indicating acceptance/rejection of item contribution implementation requests, and an item contribution requests to the communication unit 110. Specifically, the contribution control unit 120 includes a contribution implementing unit 121, a settlement control unit 122, an index calculating unit 123, a consideration determining unit 124, and a notification data generating unit 125.

When the contribution implementing unit 121 receives an item contribution implementation request for the live broadcast video from the receiving unit 111, the contribution implementing unit 121 adds the item subject to the implementation request to the video in exchange for a consideration. First, the contribution implementing unit 121 sends an item contribution implementation request to the settlement control unit 122 in order to settle the consideration. The contribution implementing unit 121 then receives a report from the settlement control unit 122 indicating whether the settlement has failed or succeeded.

When a report has been received from the settlement control unit 122 indicating that the settlement has been successful, the contribution implementing unit 121 issues an item contribution request and sends the request to the transmitting unit 112. As a result, the contribution implementing unit 121 can have the live broadcasting server 300 add the item subject to the implementation request. In other words, the live broadcasting server 300 that has received the item contribution request performs the processing for superimposing an item image on the live broadcasting video, and distributing this to the distributor terminal 200 and to viewer terminals 400. The contribution implementing unit 121 may also generate a response indicating acceptance of the item contribution implementation request and send the response to the transmitting unit 112 in order to inform the input requester that the contributed item has been implemented. As described in greater detail below, when the index calculating unit 123 calculates the index based on information in the received item contribution implementation request, the contribution implementing unit 121 writes the reception request data related to the received item contribution implementation request to a request storage unit 131. The reception request data may be a value obtained by counting the number of item contribution implementation requests received within the totaling period as described below.

When the contribution implementing unit 121 receives a report from the settlement control unit 122 indicating that the settlement has failed, the contribution implementing unit 121 cancels the item contribution. The contribution implementing unit 121 may also generate a response indicating that the item contribution implementation request has been rejected and send the response to the transmitting unit 112 in order to inform the contribution requester that the item contribution has not been executed. This response may include a message prompting the contribution requester to perform the deposit process. Settlement may fail for a variety of reasons. Therefore, the contribution implementing unit 121 may include data indicating why the item contribution request was rejected in the response. When a settlement failure is reported, the reason may be that the assets of the contribution requester do not meet the consideration (that is, the asset balance is insufficient), or the consideration indicated by the data included in the implementation request ("declared consideration" below) is incorrect. The reason may be reported to the contribution implementing unit 121 by the settlement control unit 122 together with notification of settlement failure.

The settlement control unit 122 receives an item contribution implementation request from the contribution implementing unit 121. The settlement control unit 122 extracts the identifier of the item to be contributed from the implementation request, retrieves the consideration history for contribution of the item from the consideration storage unit 133, and determines whether or not the declared consideration is included in the implementation request. For example, the settlement control unit 122 may report to the compensation implementing unit 121 that the settlement has failed because the declared consideration is incorrect when the declared consideration does not match any of the considerations decided upon in the past, or when the declared consideration is too old (for example, when the consideration was decided upon two or more times ago, or when the consideration was decided upon longer than a predetermined time ago).

When the settlement control unit 122 has determined that the declared consideration is appropriate, the settlement control unit causes the settlement server 500 to settle using the declared consideration. Specifically, the settlement control unit 122 may send a settlement request to the transmitting unit 112, and then receive a settlement response to the settlement request from the receiving unit 111. The settlement control unit 122 may then determine whether the settlement was successful or unsuccessful based on the settlement response, and report the result to the contribution implementing unit 121.

The index calculating unit 123 calculates an index corresponding to the predicted value of the contributed item activity for a live video broadcast based on, for example, (1) data related to the video being broadcast live and (2) requests for item contributions received before the index was calculated ("reception request data" below). The index calculating unit 123 sends the calculated index to the consideration determining unit 124. The index calculating unit 123 may calculate the index based on one or both of (1) and (2).

First, the operations performed by the index calculating unit 123 in the case of (1) above will be described. The index calculating unit 123 receives data related to the video being broadcast live from the receiving unit 111. This data can be received from the live broadcasting server 300, for example, every few dozen seconds or every few minutes. This cycle may be fixed or variable. Alternatively, this data may be transmitted by the live broadcasting server 300 when an event occurs based on the data (such as when the number of simultaneous viewers exceeds 100 or when the number of followers of the video distributor among the simultaneous viewers falls below 50).

The index calculating unit 123 may use the number of simultaneous viewers as the index, or may substitute the number of simultaneous viewers with a mathematical equation to calculate the index. For example, the equation may be one used to calculate statistics. Because a larger number of simultaneous viewers means a larger number of potential contribution requests, and the reaction by a large number of viewers to contributed items can be anticipated, the index calculating unit 123 calculates an index indicating a predicted value corresponding to higher activity.

The index calculating unit 123 can also calculate the index based on attributes of the distributor or viewers in addition to the number of simultaneous viewers. Specifically, the index calculating unit 123 can use as the index the (total) number of followers of the distributor of the video among the number of simultaneous viewers, the number of special followers of the video distributor among the larger number of simultaneous viewers, or the number of subscribers to the premium service plan among the number of simultaneous viewers. It can also calculate the index by plugging these numbers into a mathematical equation.

Viewers who are followers of the distributor have a stronger desire to attract attention from the distributor and support the activities of the distributor than those who do not. As a result, they may contribute items more actively. This tendency is even stronger among viewers who are special followers of the distributor. Also, viewers who are subscribers to the premium service plan may have a lower psychological hurdle to contributing items than viewers who are not. Because a higher number of these means the number of potential contribution requesters is larger, the index calculating unit 123 calculates an index indicating a predicted value corresponding to higher activity.

The index calculating unit 123 may also calculate the index based on the attributes of the distributor and or viewers. For example, the likelihood of active item contribution is high for live video broadcasts from distributors of videos with active item contributions in the past and from viewers with active item contributions in the past. Therefore, the index calculating unit 123 may receive data indicating the total amount of considerations for the contributed items carried out in the past for live video broadcasts of the distributor (for example, the previous broadcast), and predict item contribution activity for the video currently being broadcast based on this data or statistical values. Similarly, the index calculating unit 123 may receive data indicating the total amount of considerations for items contributed by the current viewers to past live videos (such as the previous video) (from the same distributor or another distributor), and predict item contribution activity for the video currently being broadcast based on this data or statistical values.

Next, the operations performed by the index calculating unit 123 in the case of (2) above will be described. The index calculating unit 123 receives reception request data from the request storage unit 131. Here, the reception request data may be, for example, a value obtained by counting the number of item contribution implementation requests received within a totaling period.

Specifically, the index calculating unit 123 may use the number of implementation requests as the index, or may plug the number of implementation requests into a mathematical equation to calculate the index. For example, the mathematical equation may be used to calculate statistics. Because a larger number of implementation requests means more items are about to be implemented in a live broadcast video, the index calculating unit 123 calculates an index indicating a predicted value corresponding to higher activity.

The index calculating unit 123 may calculate the index periodically, for example, every few dozen seconds or every few minutes so that considerations respond to short-term fluctuations in contributed item activity to a live broadcast video. The period may be fixed or variable. This cycle may or may not coincide with the totaling period mentioned above.

The consideration determining unit 124 receives an index from the index calculating unit 123 and calculates the consideration based on the index. Specifically, the consideration determining unit 124 determines the consideration so that higher contributed item activity in the live video broadcast as indicated by the index leads to a higher consideration. For example, the consideration determining unit may determine the consideration as a first value when the index is equivalent to a first predicted value and determine the consideration as a second value greater than the first value when the index is equivalent to a second predicted value, which corresponds to the contribution of items that are more active in the content than those of the first predicted value. For example, the consideration determining unit 124 may determine the consideration so that it increases monotonically with increasing activity (that is, so that it does not decrease with increasing activity). The consideration may increase linearly or non-linearly (for example, stepwise) with an increase in activity. The consideration determining unit 124 writes data indicating the decided upon consideration in the consideration storage unit 133.

The consideration determining unit 124 may determine the consideration for each type of item individually based on the index, or may instead determine a shared fluctuation ratio for a type of item. This fluctuation ratio corresponds to the intermediate consideration parameter. In this case, the consideration for each type of item can be uniquely derived by multiplying a standard consideration for the type of item defined beforehand by the fluctuation ratio. In this way, a viewer terminal 400 can display the latest values for all types of considerations by simply providing fluctuation ratios instead of considerations for all types of items each time the considerations are updated. (Here, the standard consideration is known by the viewer terminal 400.) This helps reduce the overhead associated with notification data. Also, additional programming code does not have to be written to determine the considerations for contributed items even when a new type of item has been added by updating the server software in the live broadcasting system. Instead, only a new standard consideration has to be defined.

The consideration determining unit 124 determines considerations when the index calculating unit 123 periodically calculates the index in the manner described above. The notification data generating unit 125 repeatedly generates notification data, the transmitting unit 112 repeatedly transmits notification data to the viewer terminals 400, and the viewer terminals 400 display the latest considerations on the screen each time notification data is received.

The notification data generating unit 125 receives a request to acquire the consideration notification data from the receiving unit 111. The notification data generating unit 125 uses an acquisition request as a trigger to retrieve data indicating the latest considerations from the consideration storage unit 133 and generate notification data based on the data indicating the latest considerations. The notification data generating unit 125 sends the notification data to the transmitting unit 112.

Figure 4:
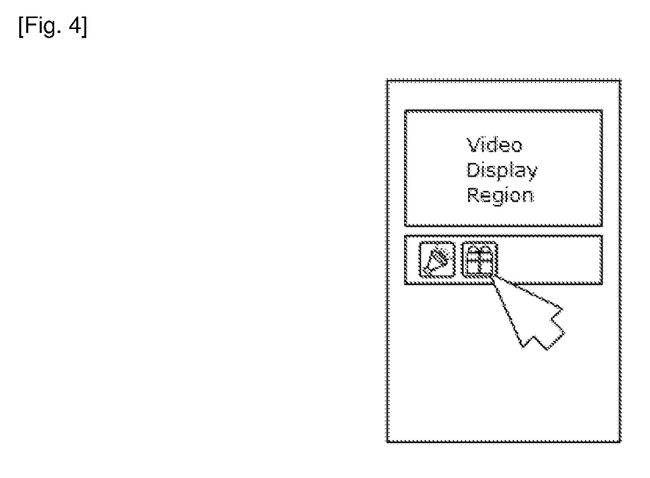
FIG. 4 is a diagram showing a video viewing page displayed on a viewer terminal in the video broadcasting system of FIG. 2.

The notification data acquisition request may be, for example, an acquisition request from a web page in which considerations for contributed items are described. An example will now be described. The video viewing page in FIG. 4 is a web page including a launcher capable of displaying a plurality of icons in addition to a video display region for displaying a live video broadcast. Two icons are displayed on the launcher, and the present-like contributed item icon allows the user to transition to the contributed item menu page, which is a web page on which considerations for contributed items are described. The notification data acquisition request in this case corresponds to acquisition requests on the contributed item menu page sent to the viewer terminal 400 when the contribution icon is selected by the user. The notification data corresponds to data obtained in response to an acquisition request.

Alternatively, the notification data acquisition request corresponds to an update request issued automatically or by an input operation by the user while the contributed item menu page (see FIG. 5) is being displayed. This menu is displayed by the contribution icon. The notification data may correspond to data obtained in response to an update request. In the example shown in FIG. 4 and FIG. 5, the video viewing page and the contributed item menu page are separate screens. However, these may be on the same screen.

Figure 5:
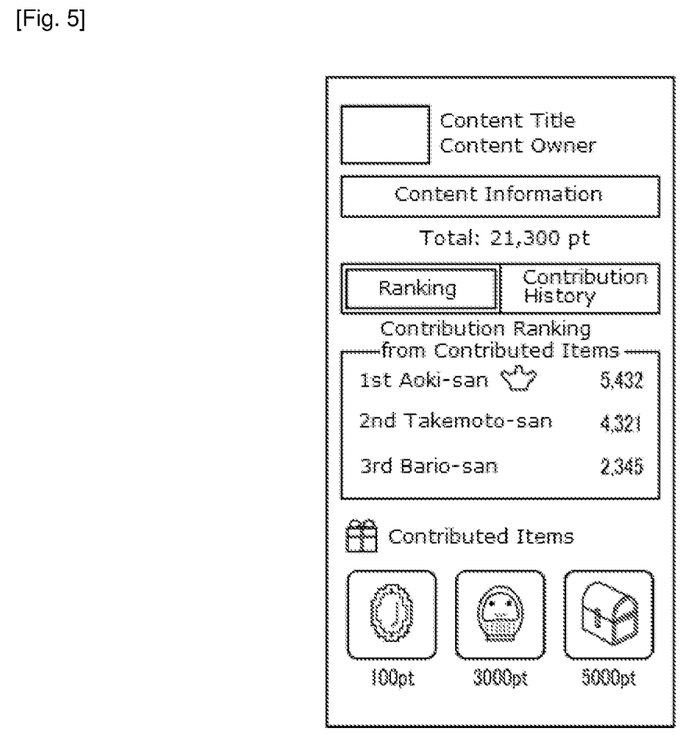
FIG. 5 is a diagram showing the contributed item menu page displayed when the contribution icon in FIG. 4 has been selected.

The contributed item menu page in FIG. 5 shows several contributed item icons (a coin, a daruma, and a treasure chest) and information indicating the consideration for each contributed item (100 pt, 3000 pt and 5000 pt). The appearance and the number of contributed item icons and the considerations for each are provided here for illustrative purposes only, and considerations for contributed items are updated each time notification data is received. The appearance of the contributed item icons may resemble or be different from the actual images of the contributed items. While not shown in FIG. 5, information on whether the current price is high or low may also be displayed. As a result, the viewer can easily determine whether the price is conducive to contributing an item or not, and can determine when to contribute an item without looking at the absolute amount of the consideration itself.

Figure 6:
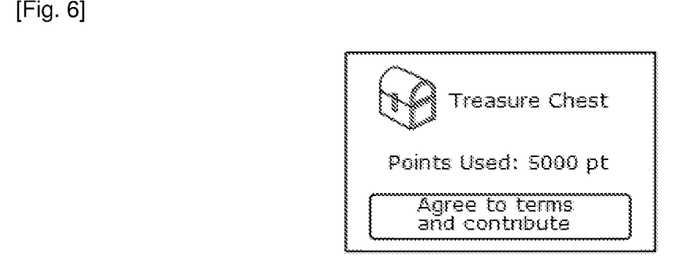
FIG. 6 is a diagram showing the contribution confirmation window that pops up when an item icon in FIG. 5 has been selected.

When any of the contributed item icons has been selected, a contribution confirmation window may pop up on the viewer terminal 400. FIG. 6 is a diagram showing the contribution confirmation window that pops up when the "treasure chest" icon has been selected. The contribution confirmation window includes the name of the selected item, an icon of the item (or an image of the actual contribution), information indicating the consideration for contributing the item, and a contributed item as a graphic user interface (GUI) component (widget) for issuing a contributed item implementation request (an "agree to terms and contribute" button). When the user of the viewer terminal 400 inputs an operation to select the contribution button, the viewer terminal 400 issues an item contribution implementation request and sends the request to the contribution control server 100. Note that some or all of the elements described here may not be displayed in the input confirmation window, and the contribute button may be displayed on a web page in which the consideration for contributing items is described, such as a contributed item menu page. Also, a text field for receiving comments from the contribution requester may be provided together with the contribute button.

The contributed item menu page in FIG. 5 also includes the title of the video displayed on the video viewing page associated with this page (the content title), the distributor (content owner), and various types of related information (content information) such as distributor comments, the video category, video tags that are keywords applied to the video, and names of video sponsors. However, some or all of these elements may not be displayed on a web page listing considerations for contributed items.

Figure 7:
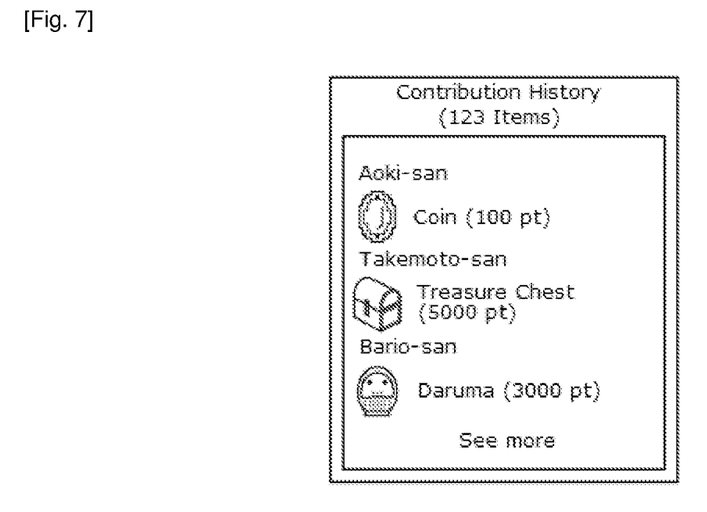
FIG. 7 is a diagram showing the contribution history displayed when the contribution history button in FIG. 5 has been selected.

The contributed item menu page in FIG. 5 also includes the cumulative amount of considerations (contributions) given via contributed items to the video displayed on the video viewing page associated with this page, ranking of contributions by contributors to the video, or a history of items contributed to the video (contribution history). The display of the ranking and the contribution history can be switched by using the corresponding buttons. FIG. 5 displays a ranking. However, the contribution history shown in FIG. 7 can be displayed instead when the user of the viewer terminal 400 selects the contribution history button. Rankings allow distributors and viewers to find out how much contributors are paying in considerations to distributors and for videos. Meanwhile, the contribution history can be used by a distributor or viewer to determine which contributors contributed what amounts in considerations even if the distributor or viewer missed the moment at which an item was contributed. However, some or all of these elements may not be displayed on the web page listing considerations for contributed items. Also, the ranking and the input history do not have to be displayed alternatingly. Instead, they may be displayed at the same time.

Note that the notification data generating unit 125 does not have to wait for an acquisition request from a viewer terminal 400. The notification data generation unit 125 may automatically generate notification data and cause the transmitting unit 112 to transmit the notification data to viewer terminals 400 each time the consideration determining unit 124 determines a consideration.

How the contribution control server 100 operates with respect to determining considerations will now be described conceptually with reference to FIG. 3. In the example shown in FIG. 3, the index calculating unit 123 calculates an index based on the number of simultaneous viewers as in one of the specific examples described above.

Figure 3:
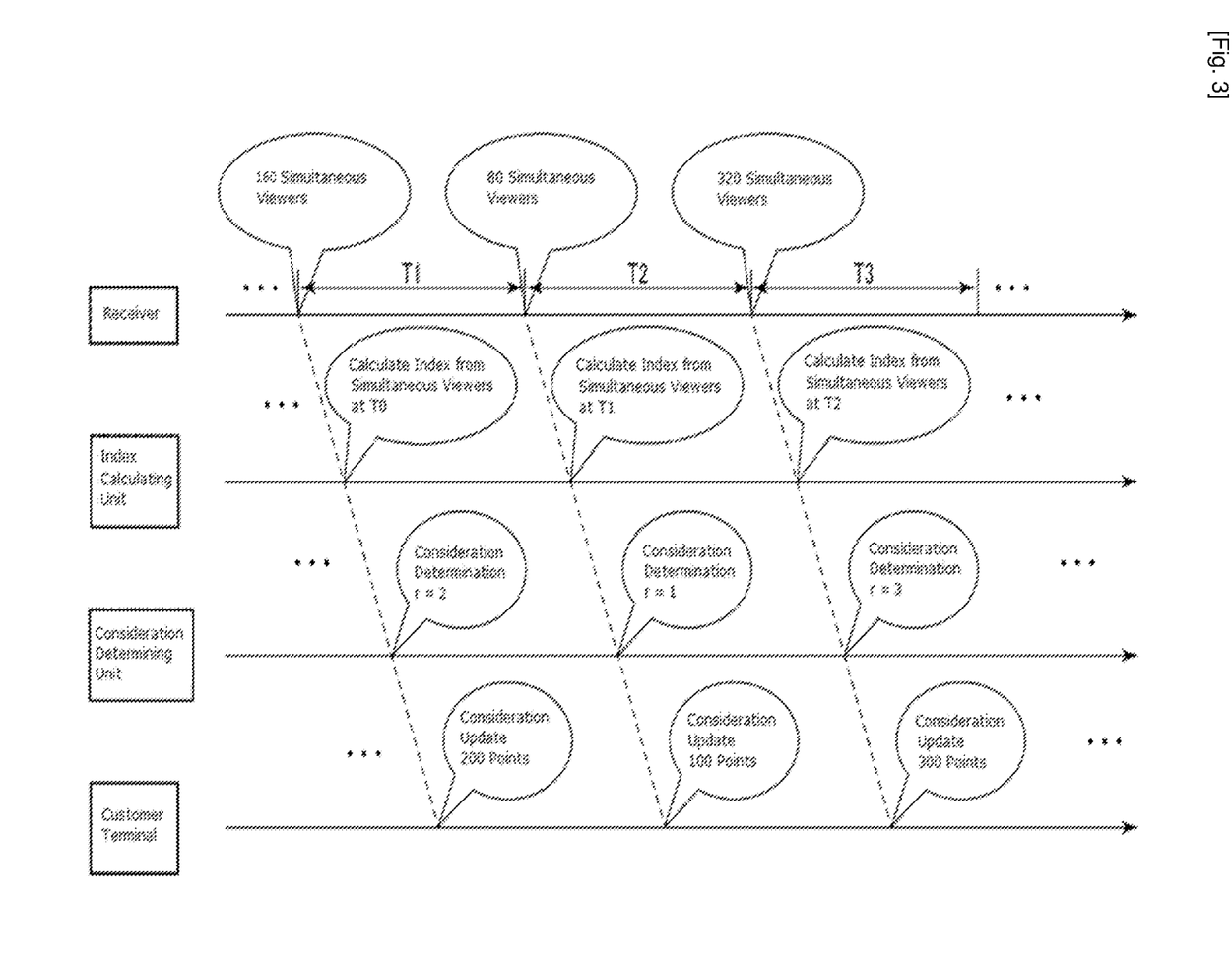
FIG. 3 is a conceptual diagram of the operations performed by the contribution control server in FIG. 1 to determine considerations.

The receiving unit 111 receives from the live broadcasting server 300 data indicating that there are 160 simultaneous viewers of a live video broadcast within totaling period T0 for the number of simultaneous viewers (that is, the period immediately before T1 in FIG. 3 though not shown in FIG. 3). The totaling period for the number of simultaneous viewers may be the same as or different from the totaling period for counting the number of requests for item contributions described above. When data indicating the number of simultaneous viewers is received a number of times during the same totaling period, the most recently received data may be used. At the end of period T0, the index calculating unit 123 calculates the index based on the number of simultaneous viewers (160 people). For example, the index calculating unit 123 may plug the number of simultaneous viewers into the equation: index=$\log_2$(number of simultaneous viewers/40). The consideration determining unit 124 then sets the fluctuation ratio r for considerations to 2 based on this index. Notification data indicating this fluctuation ratio is transmitted to the viewer terminals 400, and the viewer terminals 400 recalculate considerations based on this fluctuation ratio and display the latest consideration (200P) on the screen.

Similarly, the receiving unit 111 receives from the live broadcasting server 300 data indicating that there are 80 simultaneous viewers of a live video broadcast within totaling period T1 for the number of simultaneous viewers. At the end of period T1, the index calculating unit 123 calculates the index based on the number of simultaneous viewers (80 people). The consideration determining unit 124 then sets the fluctuation ratio r for considerations to 1 based on this index. Notification data indicating this fluctuation ratio is transmitted to the viewer terminals 400, and the viewer terminals 400 recalculate considerations based on this fluctuation ratio and display the latest consideration (100P) on the screen.

Similarly, the receiving unit 111 receives from the live broadcasting server 300 data indicating that there are 320 simultaneous viewers of a live video broadcast within totaling period T2 for the number of simultaneous viewers. At the end of period T2, the index calculating unit 123 calculates the index based on the number of simultaneous viewers (320 people). The consideration determining unit 124 then sets the fluctuation ratio r for considerations to 3 based on this index. Notification data indicating this fluctuation ratio is transmitted to the viewer terminals 400, and the viewer terminals 400 recalculate considerations based on this fluctuation ratio and display the latest consideration (300P) on the screen.

In the example shown in FIG. 1, the storage units include a request storage unit 131 and a consideration storage unit 133. These storage units may be one of the memory units mentioned above or may be a combination of a memory unit and an auxiliary storage device.

The request storage unit 131 stores the reception request data. The reception request data is written and rewritten by the contribution implementing unit 121. The reception request data may also be read by the index calculating unit 123. However, reception request data may not be used to calculate the index. In this case, the request storage unit 131 may be erased.

The consideration storage unit 133 stores data indicating considerations. The consideration storage unit 133 may also store data indicating when a consideration was determined or the number of the considerations determined after the start of a live video broadcast associated with the data indicating the considerations. This data may be required by the settlement control unit 122 to determine that a declared consideration is not incorrect. The data indicating considerations can be written and rewritten by the consideration determining unit 124. Data indicating considerations is read by the settlement control unit 122 and the notification data generating unit 125.

Figure 8:
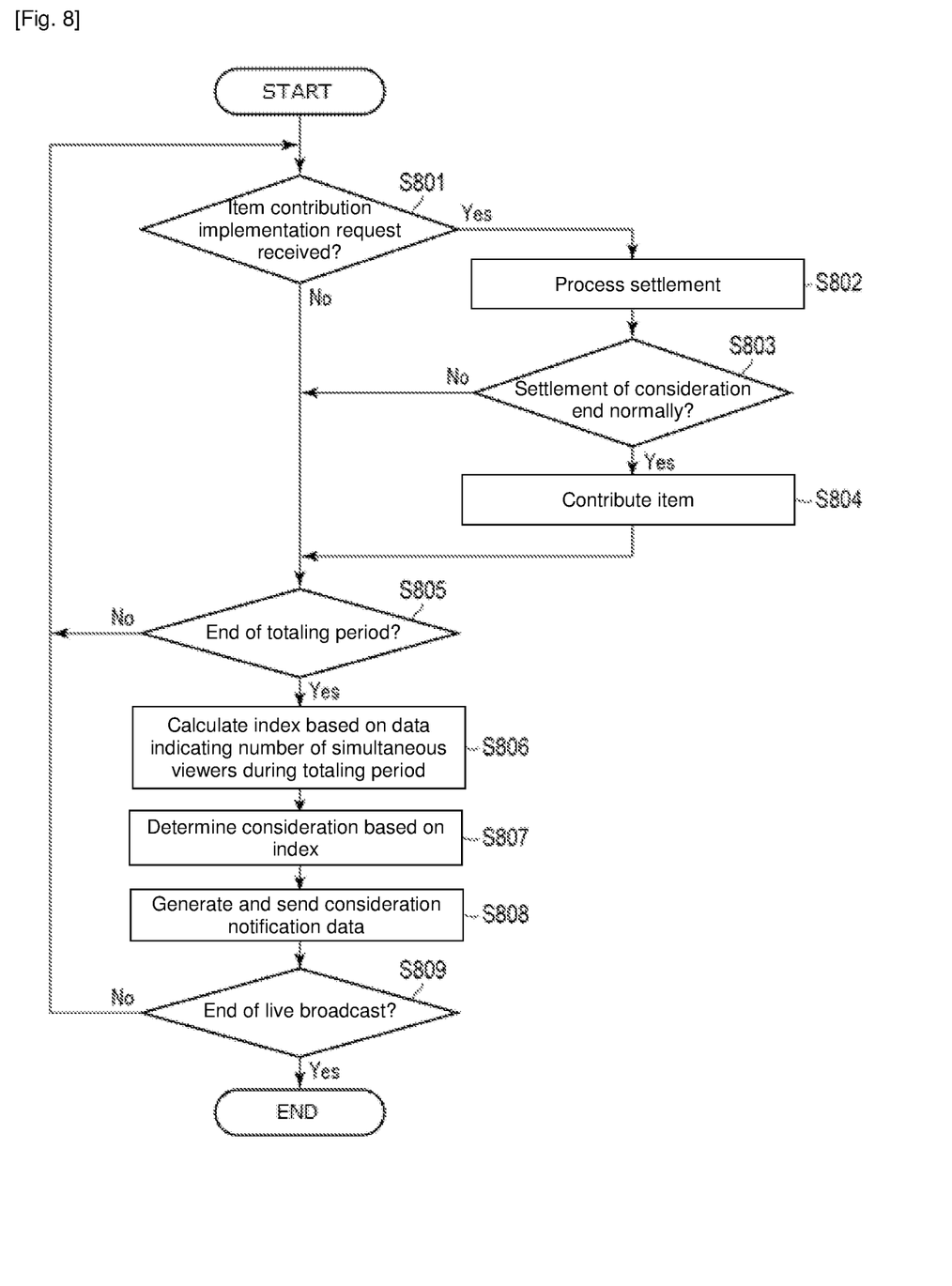
FIG. 8 is a flowchart showing operations performed by the contribution control server in FIG. 1.

An example of operations performed by the contribution control server 100 will now be described with reference to FIG. 8. In the example shown in FIG. 8, the index calculating unit 123 calculates an index based on the number of simultaneous viewers as in one of the specific examples described above.

First, when the receiving unit 111 receives an item contribution implementation request from a viewer terminal 400 (step S801), the contribution implementing unit 121 causes the settlement control unit 122 to settle the consideration based on the implementation request (step S802).

When settlement of the consideration in step S802 has been completed normally, the process advances to step S804. Otherwise, the item is not contributed based on the received implementation request. In step S804, the contribution implementing unit 121 performs the item contribution. In other words, the contribution implementing unit 121 issues an item contribution request and transmits the request to the live broadcasting server 300.

The contribution control server 100 repeats step S801 to step S804, that is, waiting for item contribution implementation requests and performing processing based on the received implementation requests (performing settlement control and item contributions as needed) until the live video broadcast ends (step S809). However, when the index and considerations have to be updated, that is, when the predetermined totaling period of the number of simultaneous viewers has expired in the example shown in FIG. 8 (step S805), the processing in steps S806 to S808 is performed. The processing in steps S801 to S804 and the processing in steps S806 to S808 can be performed in parallel. A totaling period of the number of simultaneous viewers does not have to be established. For example, the processing in steps S806 to S808 may be performed every time data indicating the number of simultaneous viewers is received.

In step S806, the index calculating unit 123 calculates the index based on data indicating the number of simultaneous viewers received within a totaling period. Data indicating the number of simultaneous viewers may be received by the receiving unit 111 before execution of step S806, that is, during the repeated execution of steps S801 to S804. The consideration determining unit 124 determines considerations (step S807) based on the index calculated in step S806. The notification data generation unit 125 generates notification data indicating the considerations determined in step S807 and transmits the notification data to viewer terminals 400 (step S808).

Exactly when step S808 is performed depends on how the notification data generating unit 125 operates. When the notification data generating unit 125 automatically generates and transmits notification data, step S808 may be performed unconditionally after the completion of step S807. When the notification data generating unit 125 generates and transmits notification data using an acquisition request from a viewer terminal 400 as a trigger, step S808 is not executed until an acquisition request has been received.

As described above, the contribution control server in the present embodiment calculates an index indicating the predicted value for item contribution activity during content such as a live video broadcast, determines the considerations based on the index, and sends notification data indicating the considerations to the viewer terminals. More specifically, the contribution control server determines considerations so that higher activity indicated by the index results in higher considerations. When item contributions to a live video broadcast are likely to be active, that is, likely to make it difficult to view individual contributed items, the consideration for contributed items increases. This may make viewers hesitate before contributing items and keep the number of contributed items from becoming too numerous. In other words, problems caused by the contribution of too many items can be prevented, such as two-way communication being impaired, viewers contributing items becoming dissatisfied with not receiving as much attention as expected, and the superimposition processing for item images becoming excessive for the live broadcasting server. However, when item contributions to a live video broadcast are unlikely to be active, that is, when it is unlikely that it will be difficult to view individual contributed items, the consideration for item contributions decreases, making it easier for viewers to contribute items. This encourages use of the item contribution function. As explained above, the contribution control server in the present embodiment can optimize the number of items contributed to content (including tip jar money).

Modified Example

The embodiment described above was applied to live content broadcasts such as live video broadcasts. However, the embodiment can also be applied to archived content as described below. Archived content may include live content broadcasts that are time-shifted.

Specifically, as in the embodiment described above, the contribution control server in the modified example calculates an index indicating the predicted value of contributed item activity for the content, determines the considerations based on the index, and transmits notification data indicating the considerations to viewer terminals. More specifically, the contribution control server determines the considerations so that the higher activity indicated by the index results in higher considerations.

In the case of live content, all viewers watch the same scene at almost the same time. However, in the case of archived content, viewing times differ by viewer and it is difficult to imagine all viewers watching the same scene at the same time. Therefore, the contribution control server in the modified example may calculate the index using a method different from that of the embodiment described above.

For example, instead of using the total number of viewers, the contribution control server (index calculating unit) may calculate the index using the number of viewers within a predetermined period of time such as the previous 24 hours or the previous week.

When the comment server records the playback time of archived content during the posting of comments on the user's terminal in association with the comment data, a time axis distribution of comment postings can be determined based on the recorded playback time data. This makes it possible to grasp, for example, the time change in the popularity of the content. During popular scenes, the attention of the viewers tends to be high. Therefore, if contributions are introduced at this time, a reaction can be expected from a large number of viewers. As a result, it can be predicted when the number of contributions by viewers will increase. As a result, the contribution control server (index calculating unit) may increase or decrease the index according to an increase or decrease in the number of comments on the time axis.

The contribution control server or another server may record the playback time of the archived content at the time a contribution request was issued on the terminal of a contribution requester. It is therefore possible to obtain the distribution of the number of requests for item contributions on the time axis based on the recorded playback time data. This can be used to grasp the time change in the popularity of the content in the same manner as the distribution of the number of comments posted on the time axis. As a result, the contribution control server (index calculating unit) may increase or decrease the index according to an increase or decrease in the number of contributions on the time axis.

When item contributions to a live video broadcast are likely to be active, that is, likely to make it difficult to view individual contributed items, the consideration for contributed items increases. This may make viewers hesitate before contributing items and keep the number of contributed items from becoming too numerous. In other words, problems caused by the contribution of too many items can be prevented, such as two-way communication being impaired (the time difference tends to be larger in archived content than in live broadcast content but two-way communication can still be established), viewers contributing items becoming dissatisfied with not receiving as much attention as expected, and the superimposition processing for item images becomes excessive for the live broadcasting server. However, when item contributions to a live video broadcast are unlikely to be active, that is, when it is unlikely that it will be difficult to view individual contributed items, the consideration for item contributions decreases, making it easier for viewers to contribute items. This encourages use of the item contribution function. In this way, the contribution control server in the modified example can optimize the number of items contributed to archived content (including the tip jar function).

The embodiments described above are just examples used to help explain the concept of the present invention and are not intended to limit the scope of the present invention. Various constituent elements can be added, deleted, and changed in the embodiments described above without departing from the spirit and scope of the present invention.

Some functional units were described in the embodiments, but these are just examples of the implementation of each functional unit. For example, functional units described as being implemented in a single device may be implemented across separate devices. Conversely, functional units described as being implemented across separate devices may be implemented in a single device.

The functional units described in each of the embodiments may be realized by using circuits. These circuits may be dedicated circuits for realizing a specific function, or may be general-purpose circuits such as a processor.

Some of the processing performed in the embodiments can also be realized by using a processor installed in a general-purpose computer as basic hardware. The program used to realize the processing may be stored on a computer-readable recording medium. The program is stored on the recording medium as a file in an installable format or as a file in an executable format. Examples of recording media include magnetic disks, optical disks (CD-ROM, CD-R, DVD, etc.), magneto-optical disks (MO, etc.), and semiconductor memories. The recording medium can be any medium that can store the program and be read by a computer. The program used to realize the processing may be stored on a computer (server) connected to a network such as the internet for download to a computer (client) via the network.

The invention claimed is:

1. A server comprising:
a calculating unit that calculates an index corresponding to a predicted value of an activity of items contributed to content;
a determination unit that determines a consideration for a viewer of the content based on the index for contributing an item to the content; and
a contribution implementing unit that, subject to an implementation request, superimposes an image of the item on the content, in exchange for the consideration when a contribution implementation request is received,
wherein the determination unit determines the consideration as a first value when the index is equivalent to a first predicted value and determines the consideration as a second value greater than the first value when the index is equivalent to a second predicted value, which corresponds to contribution of items that are more active in the content than those of the first predicted value.

2. The server according to claim 1, wherein the calculating unit calculates the index based on data related to the content.

3. The server according to claim 2, wherein
the content is live broadcast content, and
the calculating unit calculates the index based on a number of simultaneous viewers of the live broadcast content.

4. The server according to claim 2, wherein the calculating unit calculates the index based on attributes of viewers of the content.

5. The server according to claim 2, wherein the calculating unit calculates the index based on attributes of a distributor of the content.

6. The server according to claim 1, wherein the calculating unit calculates the index based on a received implementation request.

7. The server according to claim 6, wherein the calculating unit calculates the index based on a number of received implementation requests.

8. The server according to claim 1, wherein
the calculating unit periodically calculates the index, and
the determination unit periodically determines the consideration based on the index.

9. The server according to claim 1, wherein
the determination unit determines a variable ratio as an intermediate parameter for consideration based on the index, and
consideration is a value obtained by multiplying a predetermined reference consideration for a type of item receiving the consideration by the variable ratio.

10. A non-transitory computer readable medium having executable programming instruction stored thereon that is configured—to cause a computer to:
calculate an index corresponding to a predicted value of an activity of items contributed to content;
determine a consideration for a viewer of the content based on the index for contributing an item to the content; and
superimpose, subject to an implementation request, an image of the item on the content in exchange for the consideration when a contribution implementation request is received,
wherein the consideration is determined as a first value when the index is equivalent to a first predicted value, and
wherein the consideration is determined as a second value greater than the first value when the index is equivalent to a second predicted value, which corresponds to contribution of items that are more active in the content than those of the first predicted value.

* * * * *